United States Patent [19]

Fukuzaki

[11] Patent Number: 5,699,084
[45] Date of Patent: Dec. 16, 1997

[54] COMPUTER SYSTEM

[75] Inventor: Yasuhiro Fukuzaki, Saitama-ken, Japan

[73] Assignee: Wacom Co., Ltd., Saitama-ken, Japan

[21] Appl. No.: 434,393

[22] Filed: May 3, 1995

[30] Foreign Application Priority Data

Jun. 29, 1994 [JP] Japan .................................. 6-148183

[51] Int. Cl.$^6$ .................................................. G09G 3/02
[52] U.S. Cl. ................................... 345/179; 178/18
[58] Field of Search ...................... 345/179, 156, 345/169, 825.31, 825.34; 348/734; 178/19, 18, 20; G09C 3/02; G06F 3/03, 3/02

[56] References Cited

U.S. PATENT DOCUMENTS

| 5,349,139 | 9/1994 | Verrier et al. | |
| 5,453,762 | 9/1995 | Ho et al. | 345/179 |
| 5,457,454 | 10/1995 | Sugano | 341/22 |
| 5,478,976 | 12/1995 | Kano | 178/19 |

FOREIGN PATENT DOCUMENTS 2-155020  6/1990  Japan .

*Primary Examiner*—Michael H. Lee
*Attorney, Agent, or Firm*—Lowe, Price, LeBlanc & Becker

[57] ABSTRACT

A computer system which allows a particular position pointing device to be used only with a particular software program. The computer system is provided with an identifying information generating means which issues identifying information telling a particular position pointing device that it is a position pointing device matched to a particular software program, a software recognizing means for recognizing the particular software program in accordance with the identifying information, a software initiating means for initiating the particular software program, and a software selecting means for selectively supplying various types of information, which is issued from the position detecting device main unit when the particular position pointing device is operated, only to the particular software program, thus allowing the particular position pointing device to be used only with the particular software program.

12 Claims, 15 Drawing Sheets

FIG. 15
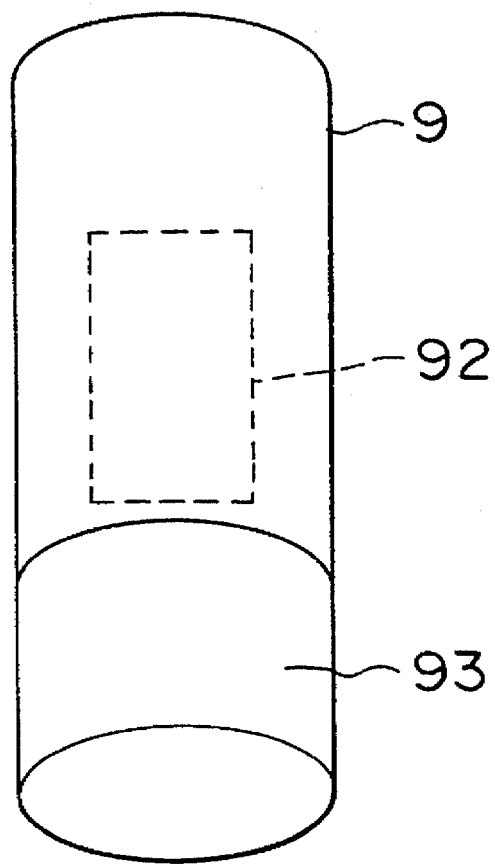
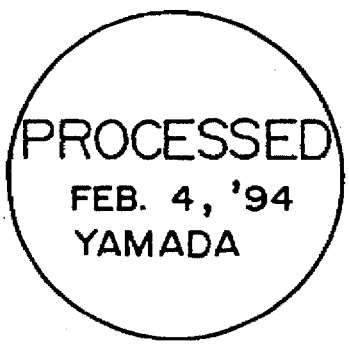
REQUEST SHEET
FOR PROCESSING
- - - - -
PROCESSED
FEB. 4, '94
YAMADA

COMPUTER SYSTEM

BACKGROUND OF THE INVENTION

1. Field of the Invention

The present invention relates to a computer system equipped with a position detecting device as an input device.

2. Description of the Related Art

The applicant has proposed in Japanese Patent Application No. 63-309256 (Japanese Patent Laid-Open No. 2-155020) an invention wherein a position detecting device equipped with a plurality of position pointing devices, which can be used, being distinguished from each other, is employed, and each of the plurality of position pointing devices is assigned a different instruction content and the external shape of each position pointing device is associated with the instruction content thereof, thereby making it possible to enter the instruction content simply by selecting and using the position pointing device having the external shape which corresponds to the instruction content.

To be more specific about Japanese Patent Laid-Open No. 2-155020, when a position pointing device shaped like an eraser is used, an image can be partially erased; and using a position pointing device shaped like an ink bottle opens the menu for setting drawing colors.

The plurality of position pointing devices disclosed in Japanese Patent Laid-Open No. 2-155020 correspond to various functions of a particular application software program and they were extremely useful when used for the particular application software program.

In recent years, computer systems equipped with an operating environment called "multi-window processing" are becoming commercially practical. In such an operating environment, a plurality of application software programs are run at the same time and also displayed simultaneously on the screen of a display unit.

In such a computer system, to make the aforesaid plurality of position pointing devices usable commonly with all application software programs, it is necessary to set the correspondences between the respective position pointing devices and the instruction contents thereof in the respective application software programs. This is a complicated, error-prone work. Furthermore, some application software programs do not have any instruction contents corresponding to the external shapes of the position pointing devices. These posed a problem in that good operability is not guaranteed for every application software.

As an operating environment in the aforesaid computer system, there is one called graphical user interface (GUI). This GUI is designed to display a plurality of choices called menus or icons on the screen of a display unit. By superimposing a particular pattern called a pointer or cursor, which moves on the screen in response to the operation of a pointing device such as the mouse, on one of the choices and by giving a switching signal or the like, a predetermined application software program connected to the choice is initiated or predetermined processing or a predetermined function associated with the choice is implemented.

When initiating the application software or implementing processing or a function through the aforesaid GUI, it is not required to enter a command or the like comprised of a plurality of characters typed through a keyboard, eliminating the need of operating the keyboard or remembering the character strings of commands. In the case of the menus displayed in a hierarchy, only the necessary choices are displayed for each case; therefore, there are fewer chances of confusion. This advantage permits an operating environment which compensates for unfamiliarity especially among beginners.

A mouse generally used as a pointing device, however, is capable of entering only a relative two-dimensional coordinate information and one to three types of switch signals; therefore, the good operability found in the aforesaid position pointing devices could not be expected for particular application software. Moreover, it was possible to implement processing and functions related to the basic software (OS) or the like, whereby all application software programs and systems are managed, by operating a pointing device. This presented a problem in that an operator who has less knowledge, an operator who, for example, is familiar only with a particular application software program may unintentionally destroy a file of a different application software program or may accidentally change the setting of the basic software and render a system itself disabled.

SUMMARY OF THE INVENTION

Accordingly, it is an object of the present invention to provide a computer system which allows a particular position pointing device to be operated only by a particular software program.

It is another object of the present invention to provide a computer system which allows a particular software program to be initiated by a particular position pointing device.

It is still another object of the present invention to provide a computer system which allows a position pointing device having an aspect suited to a particular software program to be operated only by the particular software program or allows the particular software program to be initiated.

To these ends, according to claim 1 of the present invention, there is provided a computer system equipped with a position detecting device capable of transmitting other information in addition to positional information to a position detecting device main unit from a position pointing device, and software which employs the position detecting device as a major input device, the computer system further including an identifying information generating means which generates identifying information for telling a particular position pointing device that it is a position pointing device matched to a particular software program, a software recognizing means for recognizing a particular software program from the identifying information which is generated from the aforesaid particular position pointing device and entered through the position detecting device main unit, and a software selecting means for supplying various types of information, which is issued from the position detecting device main unit when the aforesaid particular position pointing device is operated, only to a particular software program.

Further, according to claim 2, there is provided a computer system equipped with a position detecting device capable of transmitting other information in addition to positional information to a position detecting device main unit from a position pointing device, and software which employs the position detecting device as the major input device, the computer system further including an identifying information generating means which generates identifying information for telling a particular position pointing device that it is a position pointing device matched to a particular software program, a software recognizing means for recognizing a particular software program from the identifying information which is generated from the aforesaid particular position pointing device and entered through the position detecting device main unit, an initiation determining means for determining whether the particular software program has already been initiated, and a software initiating means which initiates the particular software program if the determination results indicates that the particular software program has not been initiated yet.

Furthermore, according to claim 3, there is provided a computer system equipped with a position detecting device capable of transmitting other information in addition to positional information to the position detecting device main unit from a position pointing device, and software which employs the position detecting device as the major input device, the computer system further including an identifying information generating means which generates identifying information for telling a particular position pointing device that it is a position pointing device matched to a particular software program, a software recognizing means for recognizing a particular software program from the identifying information which is generated from the aforesaid particular position pointing device and entered through the position detecting device main unit, an initiation determining means for determining whether the particular software program has already been initiated, a software initiating means which initiates the particular software program if the determination results indicates that the particular software program has not been initiated yet, and a software selecting means for supplying various types of information, which is issued from the position detecting device main unit when the aforesaid particular position pointing device is operated, only to a particular software program.

According to claim 4, there is provided a computer system according to claim 1 to 3, wherein a particular position pointing device has an aspect optimized for a particular software program.

According to claim 1 of the present invention, when a particular position pointing device is brought onto the position detecting device main unit, the identifying information generated from the identifying information generating means of the particular position pointing device is supplied to the software recognizing means via the position detecting device main unit, and the corresponding particular software is recognized. After that, various types of information output from the position detecting device main unit when the aforesaid particular position pointing device is operated is supplied only to the aforesaid particular software by the software selecting means. Therefore, by providing an operator, who is, for example familiar only with a particular software program, with only a particular position pointing device which is matched to the particular software program, the danger of the operator erroneously operating other software can be eliminated.

According to claim 2, when a particular position pointing device is brought onto the position detecting device main unit, the identifying information generated from the identifying information generating means of the particular position pointing device is supplied to the software recognizing means via the position detecting device main unit, and the corresponding particular software is recognized. Further, it is determined by the initiation determining means whether the particular software has been initiated, and if it has not yet been initiated, then the software initiating means initiates the particular software. Hence, an operator does not have to initiate particular software each time the operator uses the particular software.

Further, according to claim 3, when a particular position pointing device is brought onto the position detecting device main unit, the identifying information generated from the identifying information generating means of the particular position pointing device is supplied to the software recognizing means via the position detecting device main unit, and the corresponding particular software is recognized. Further, it is determined by the initiation determining means whether the particular software has been initiated, and if it has not yet been initiated, then the software initiating means initiates the particular software. After that, various types of information output from the position detecting device main unit when the aforesaid particular position pointing device is operated is supplied only to the aforesaid particular software by the software selecting means. Therefore, an operator does not have to initiate particular software each time the operator uses the particular software. Moreover, by providing an operator, who is, for example, familiar only with a particular software program, with only a particular position pointing device which is matched to the particular software program, the danger of the operator erroneously operating other software can be eliminated.

According to claim 4, the operability of particular software can be achieved according to the characteristics thereof, enabling the best possible use of the characteristics of the particular software.

BRIEF DESCRIPTION OF THE DRAWINGS

FIG. 15 is a configuration diagram of still another example of the position pointing device equipped with an aspect suited for particular software.

DESCRIPTION OF THE PREFERRED EMBODIMENTS

Figure 1:
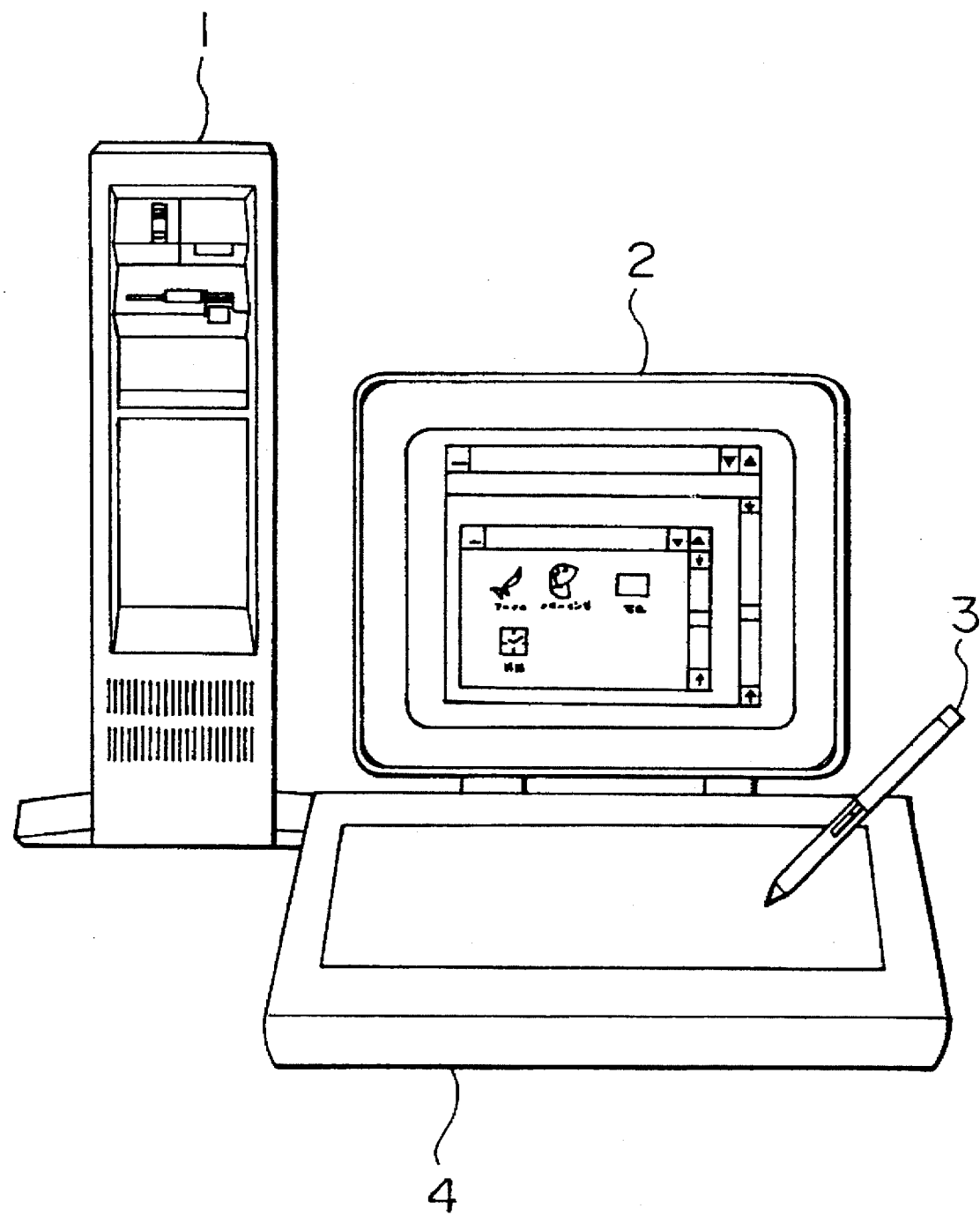
FIG. 1 is a configuration diagram of an outline of an embodiment of the computer system in accordance with the present invention.

FIG. 1 is an overview illustration of an embodiment of the computer system in accordance with the present invention.

In the drawing, numeral 1 denotes a computer main unit, numeral 2 a display unit (CRT), numeral 3 a position pointing device, and numeral 4 a position detecting device main unit.

Figure 2:
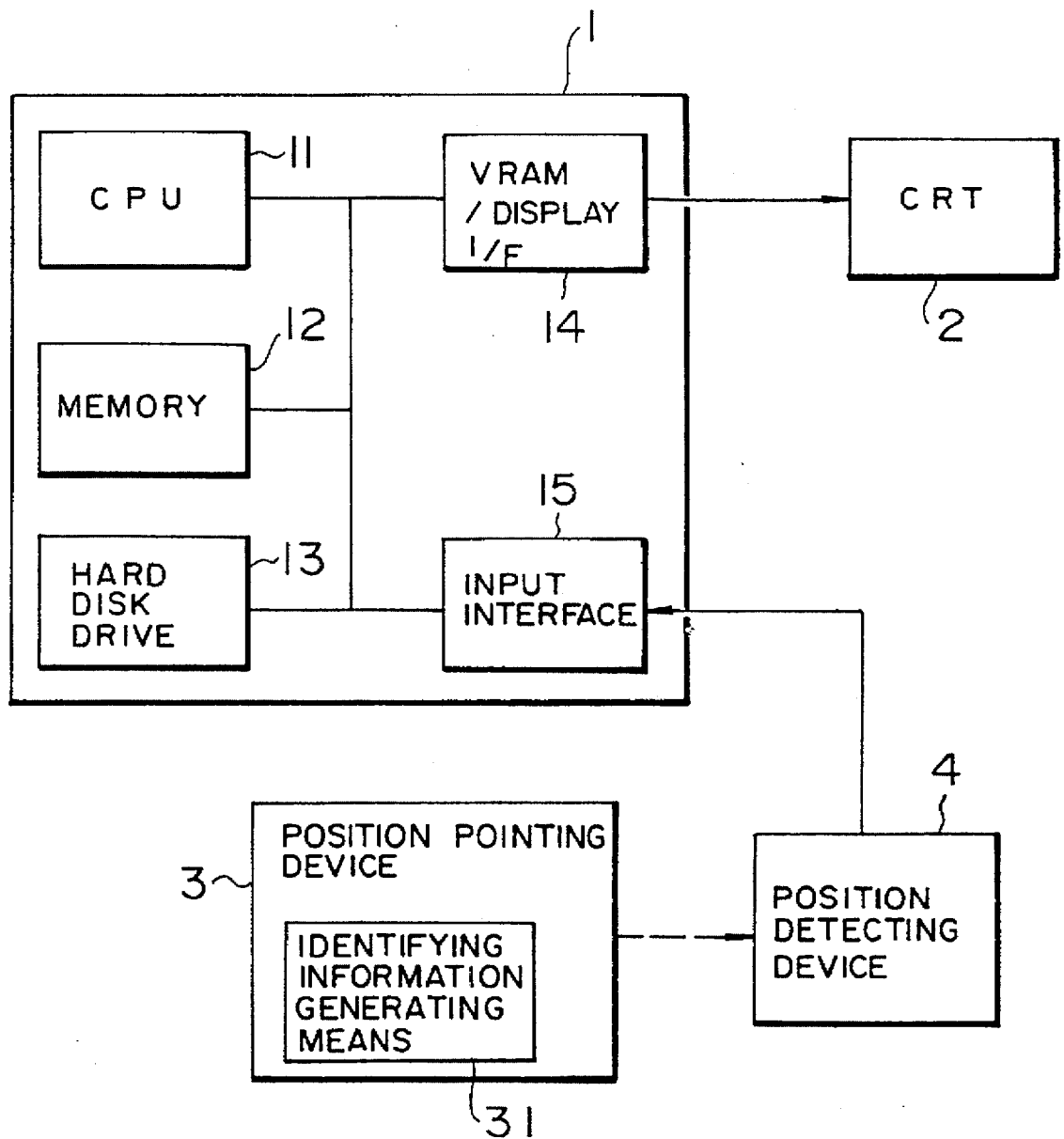
FIG. 2 is a block diagram of the hardware configuration in the computer system of FIG. 1.

As shown in FIG. 2, the computer main unit 1 is provided with a microprocessor (CPU) 11, a memory 12, a hard disk drive 13, a VRAM/display interface (IF) 14, and an input interface 15. The CRT 2 is connected to the VRAM/display IF 14 of the computer main unit 1.

The position pointing device 3 is capable of transmitting to the position detecting device main unit 4 a regular signal related to a pointed position, operating information, and the identifying information, which indicates that it is the position pointing device matched to, or corresponding with, a particular software program; device 3 is equipped with an identifying information generating means 31 which generates the aforesaid identifying information. The position detecting device main unit 4, which is connected to the input interface 15 of the computer main unit 1, determines the coordinate value (coordinate information) of a pointed position from the signal related to the pointed position received from the position pointing device 3, receives the operating information and the identifying information, and supplies the information to the computer main unit 1.

The position pointing device 3 is prepared for each particular software program; however, only one position pointing device is shown in this embodiment. The details of the position detecting device, which is constituted by the position pointing device 3 and the position detecting device main unit 4, will be given later.

Figure 3:
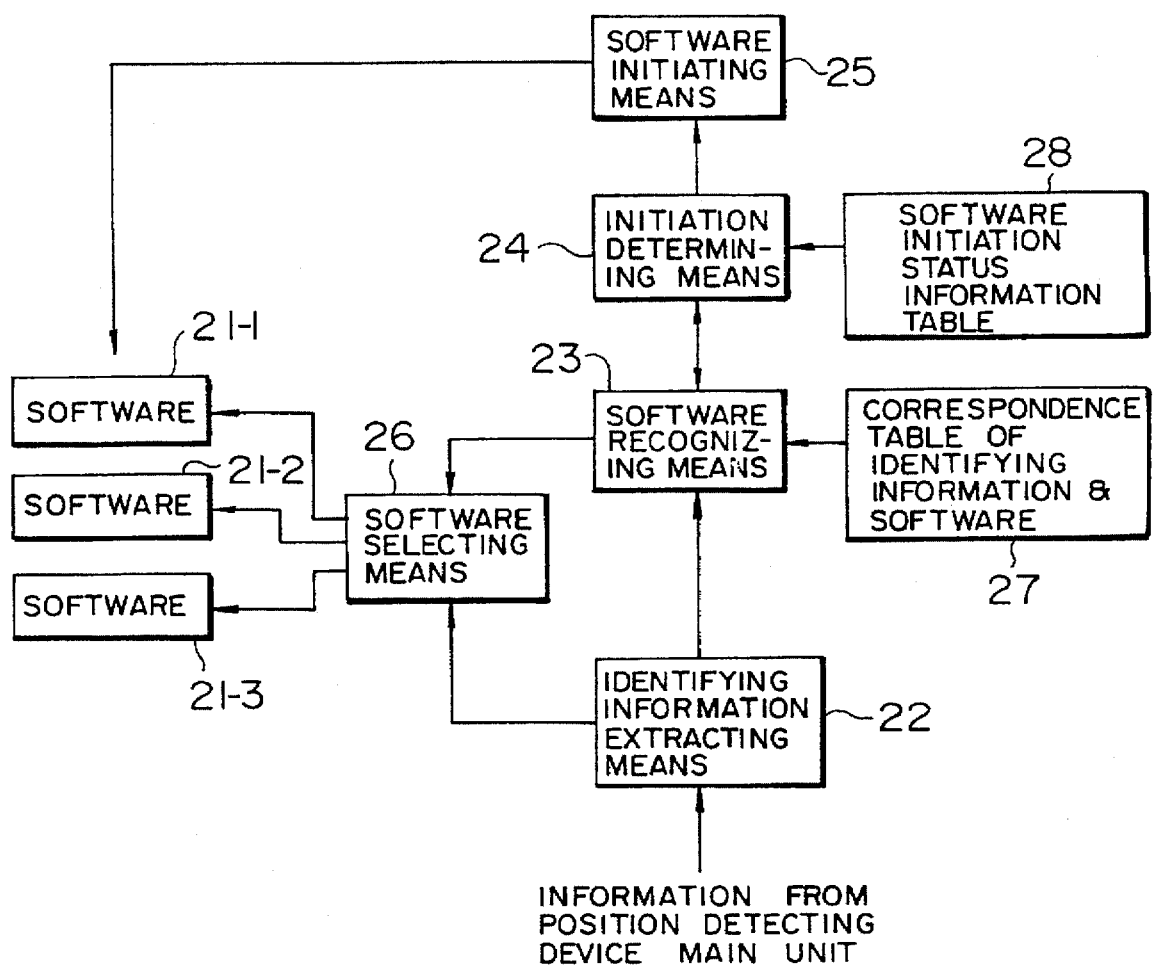
FIG. 3 is a block diagram of the software configuration in the computer system of FIG. 1.

FIG. 3 is a block diagram of the software configuration of the computer main unit 1 of FIG. 1. In the drawing, numerals 21-1, 21-2, and 21-3 denote software programs, numeral 22 denotes an identifying information extracting means, numeral 23 a software recognizing means, numeral 24 an initiation determining means, numeral 25 a software initiating means, numeral 26 a software selecting means, numeral 27 a correspondence table of identifying information and software, and numeral 28 a software initiation status information table.

The software programs 21-1 through 21-3 are the basic software program for managing a system and a plurality of (three in this embodiment) particular software programs including various application software programs. The software programs sometimes exchange information; however, in this case, they are independent. The identifying information extracting means 22 takes out only the identifying information from the information received from the position detecting device main unit 4 and sends it to the software recognizing means 23 and sends the remaining information to the software selecting means 26.

The software recognizing means 23 recognizes a particular corresponding software program according to the identifying information received from the identifying information extracting means 22 by referring to the correspondence table 27 of identifying information and software, and supplies the result to the initiation determining means 24 and the software selecting means 26. The correspondence relationship between each identifying information and each software program is to be described beforehand in the correspondence table 27 of identifying information and software.

The initiation determining means 24 determines whether the aforesaid particular software has already been initiated, by referring to the software initiation status information table 28. If the initiation determining means finds that the particular software has not yet been initiated, then it provides the software initiating means 25 with the information for specifying the particular software to be initiated. The initiation status of each software program is to be described beforehand in the software initiation status information table 28.

When the software initiating means 25 receives the information for specifying the aforesaid particular software to be initiated, it initiates the appropriate particular software in a predetermined procedure. The software selecting means 26 selectively supplies the information other than the identifying information among the information received from the position detecting device main unit 4, i.e., the coordinate information and the operating information, only to the aforesaid particular software which has been reported.

The operation of the system mentioned above will now be described.

When the operator brings the particular position pointing device 3 corresponding to a particular software to be operated, e.g., 21-1, onto the position detecting device main unit 4, the identifying information issued from the identifying information generating means 31 of the position pointing device 3 is transmitted together with the signal related to the pointed position and the operating information to the position detecting device main unit 4. The position detecting device main unit 4 determines the coordinate value (coordinate information) of the pointed position from the signal related to the pointed position and reports the determined coordinate value as well as the operating information and identifying information to the computer main unit 1.

The identifying information is extracted from the information received from the position detecting device main unit 4 by the identifying information extracting means 22 of the computer main unit 1 and the extracted identifying information is sent to the software recognizing means 23, while the remaining information, namely, the coordinate information and the operating information, are sent to the software selecting means 26. The software recognizing means 23 which has received the identifying information recognizes the corresponding particular software program, namely, 21-1, by referring to the correspondence table 27 of identifying information and software, then supplies the result to the initiation determining means 24 and the software selecting means 26.

The initiation determining means 24 which has received the result determines whether the particular software, i.e., 21-1 in this case, has already been initiated, by referring to the software initiation status information table 28. If the initiation determining means 24 determines that the particular software, 21-1, has already been initiated, then it does not do anything; if it determines that the particular software, 21-1, has not yet been initiated, then it supplies the information for instructing the initiation of the particular software, 21-1, to the software initiating means 25.

Upon receipt of the information for instructing the initiation of the particular software, 21-1, the software initiating means 25 initiates the particular software, 21-1, according to the predetermined procedure.

The software selecting means 26, which has received the notice indicating that the particular software which corresponds to the particular position pointing device 3 in use is 21-1, selectively supplies the coordinate information and the operating information received from the position detecting device main unit 4 only to the particular software 21-1.

Thus, according to the embodiment described above, even when a plurality of software programs are running at the same time, by selecting and using a particular position pointing device which corresponds to a particular software program to be operated, the operation on only that particular software program can be carried out. Moreover, if the particular software program has not yet been initiated, then it can be automatically initiated and after that, the operation on the particular software program can be implemented. Hence, by providing an operator, who is, for example familiar only with a particular software program, with only a particular position pointing device which is matched to the particular software program, the danger of the operator erroneously operating other software can be eliminated. In addition, even if the operator does not know how to initiate the software, the operator can operate it.

The specific embodiments of the position pointing device and the position detecting device main unit will now be described.

Figure 4:
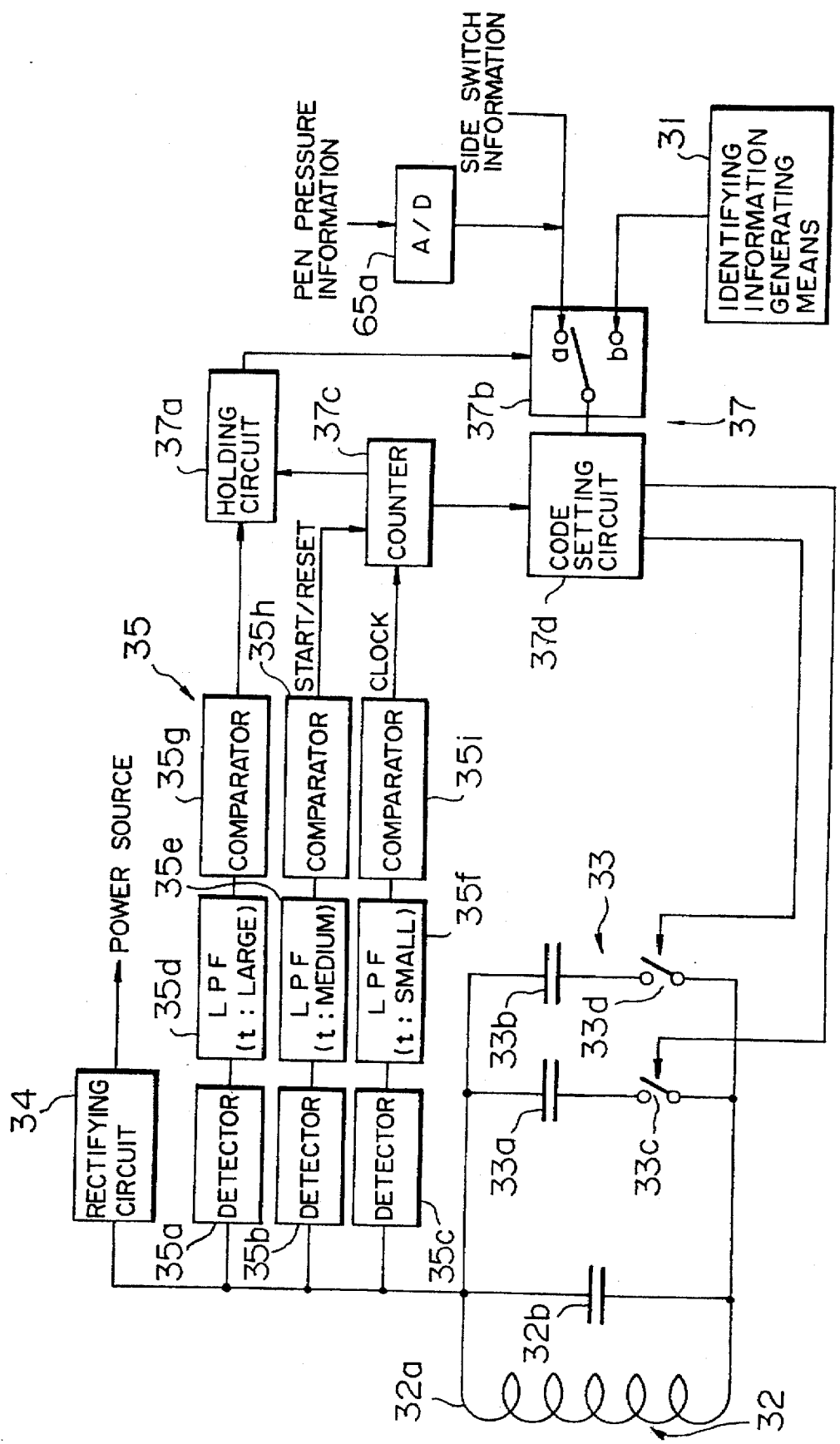
FIG. 4 is a configuration diagram of an embodiment of the position pointing device illustrated in FIG. 1.

FIG. 4 is a block diagram of an embodiment of the position pointing device 3. In the drawing, numeral 31 denotes an identifying information generating means, numeral 32a a coil, numerals 32b, 33a, and 33b capacitors, numerals 33c and 33d switches, numeral 34 a rectifying circuit, numerals 35a, 35b, and 35c detectors, and numerals 35d, 35e, and 35f low-pass filters (LPFs). Further, numerals 35g, 35h, and 35i indicate comparators, numeral 36 indicates an analog-to-digital (A/D) converting circuit, numeral 37a a holding circuit, numeral 37b a changeover switch, numeral 37c a counter, and numeral 37d a code setting circuit.

The identifying information generating means 31 generates the identifying information, e.g., a plurality of bits of binary code, indicating that a position pointing device corresponds to a particular software program; it is constituted by a plurality of small switches, memories, etc. which can be set to the statuses corresponding to the plurality of bits of binary code. As the memories for this purpose, nonvolatile memories or SRAMs backed up by batteries may be used.

The coil 32a and the capacitor 32b are interconnected in series to constitute a well-known resonance circuit 32. The capacitors 33a and 33b are connected in parallel to the capacitor 32b of the resonance circuit 32 via the switches 33c and 33d, respectively, to constitute a characteristic control means 33 which changes the resonance frequency of the resonance circuit 32 in accordance with the four combinations of ON and OFF of the switches 33c and 33d, thereby controlling the resonance characteristic of the resonance circuit 32 to one of the four different resonance characteristics.

The rectifying circuit 34 constitutes a power extracting means which takes out a DC voltage from induced voltage which occurs in the resonance circuit 32 and supplies it to other circuits as a line voltage.

The detector 35c, the low-pass filter 35f, and the comparator 35i take out the induced voltage, which intermittently appears at predetermined intervals and lasts for a certain duration, from the induced voltage appearing in the resonance circuit 32 by means of the low-pass filter 35f having a relatively small time constant (t) and they shape the waveform thereof to produce clocks. Likewise, the detector 35b, the low-pass filter 35e, and the comparator 35h take out only the induced voltage, which lasts for not less than a predetermined period of time which is sufficiently longer than the aforesaid certain duration, from the induced voltage appearing in the resonance circuit 32 by means of the low-pass filter 35e having a medium time constant (t) and they shape the waveform thereof to generate an initiation timing signal. The detector 35a, the low-pass filter 35d, and the comparator 35g take out only the induced voltage, which lasts for not less than a period of time that is even longer than the foregoing predetermined period of time (referred to as the longest period of time hereinafter) from the induced voltage appearing in the resonance circuit 32 by means of the low-pass filter 35d having a relatively large time constant (t) and they shape the waveform thereof to generate a switching signal. These components constitute an instruction extracting means 35.

The A/D converting circuit 36 converts an analog value corresponding to the operating information, i.e., the analog voltage output from a pressure-sensitive element, which is not shown, in accordance with the pen pressure in this case, into a plurality of bits of digital value, namely, binary code. The A/D converting circuit 36 and a switch (not shown) which generates side switch information constitute the operating information generating means which generates a plurality of bits of binary code which express the operating information.

The holding circuit 37a holds the aforesaid switching signal until it receives a reset signal from the counter 37c, then it outputs it to the changeover switch 37b. The changeover switch 37b is normally connected to a contact "a" through which the operating information, namely, the pen pressure information or the side switch information in this case, is supplied, while it is connected to a contact "b" through which the identifying information is supplied only while the switching signal is being applied. The counter 37c and the code setting circuit 37d are started by the initiation timing signal; each time the count value on the counter 37c, which counts the clocks, is updated, the counter 37c and the code setting circuit 37d output two bits out of a plurality of bits of a digital value, which are supplied from the A/D converting circuit 36 selected by the changeover switch 37b and the side switch (not shown) or the identifying information generating means 31 to the code setting circuit 37d, to the switches 33c and 33d at the same time in sequence, issuing two bits of binary code out of a plurality of bits of binary code, which express the operating information or the identifying information in synchronization with a clock following the input of the aforesaid initiation timing signal. These components constitute the information setting means 37.

Figure 5:
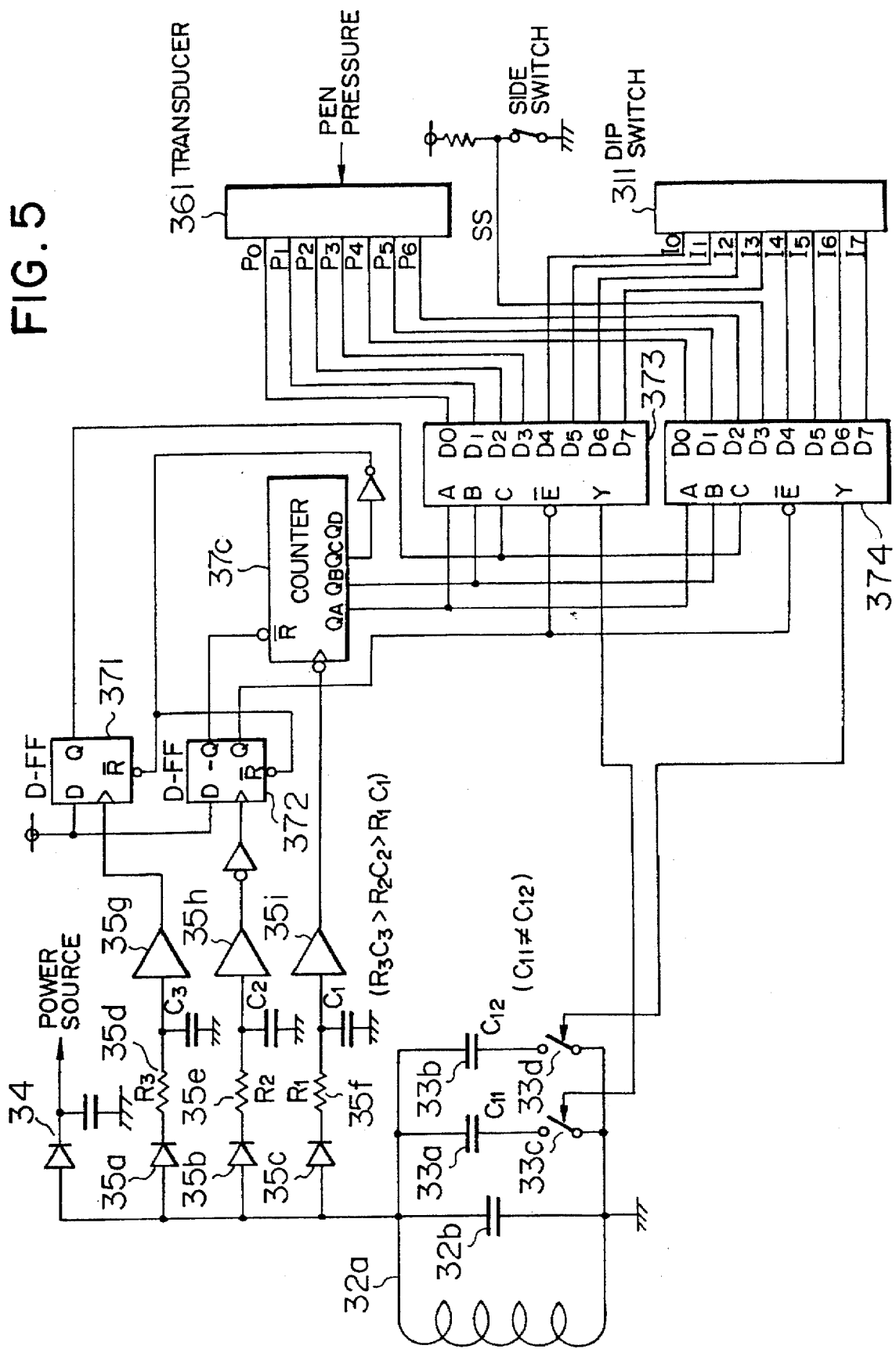
FIG. 5 is a configuration diagram of a specific example of the position pointing device of FIG. 4.

FIG. 5 shows a specific circuit of the position pointing device shown in FIG. 4. For this circuit, 7-bit pen pressure information, 1-bit side switch information, and 8-bit identifying information are employed as the operating information. In the drawing, numeral 311 denotes a DIP switch equipped with eight switches, which corresponds to the identifying information generating means 31 of FIG. 4. Numeral 361 denotes a transducer which outputs a digital value in accordance with the pen pressure; it corresponds to the A/D converting circuit 36 shown in FIG. 4. Numerals 371 and 372 indicate D flip-flops and they constitute the holding circuit 37a shown in FIG. 4. Numerals 373 and 374 indicate multiplexers and they respectively constitute the changeover switch 37b and the code setting circuit 37d shown in FIG. 4. The rest of the configuration is identical to that of FIG. 4.

Figure 6:
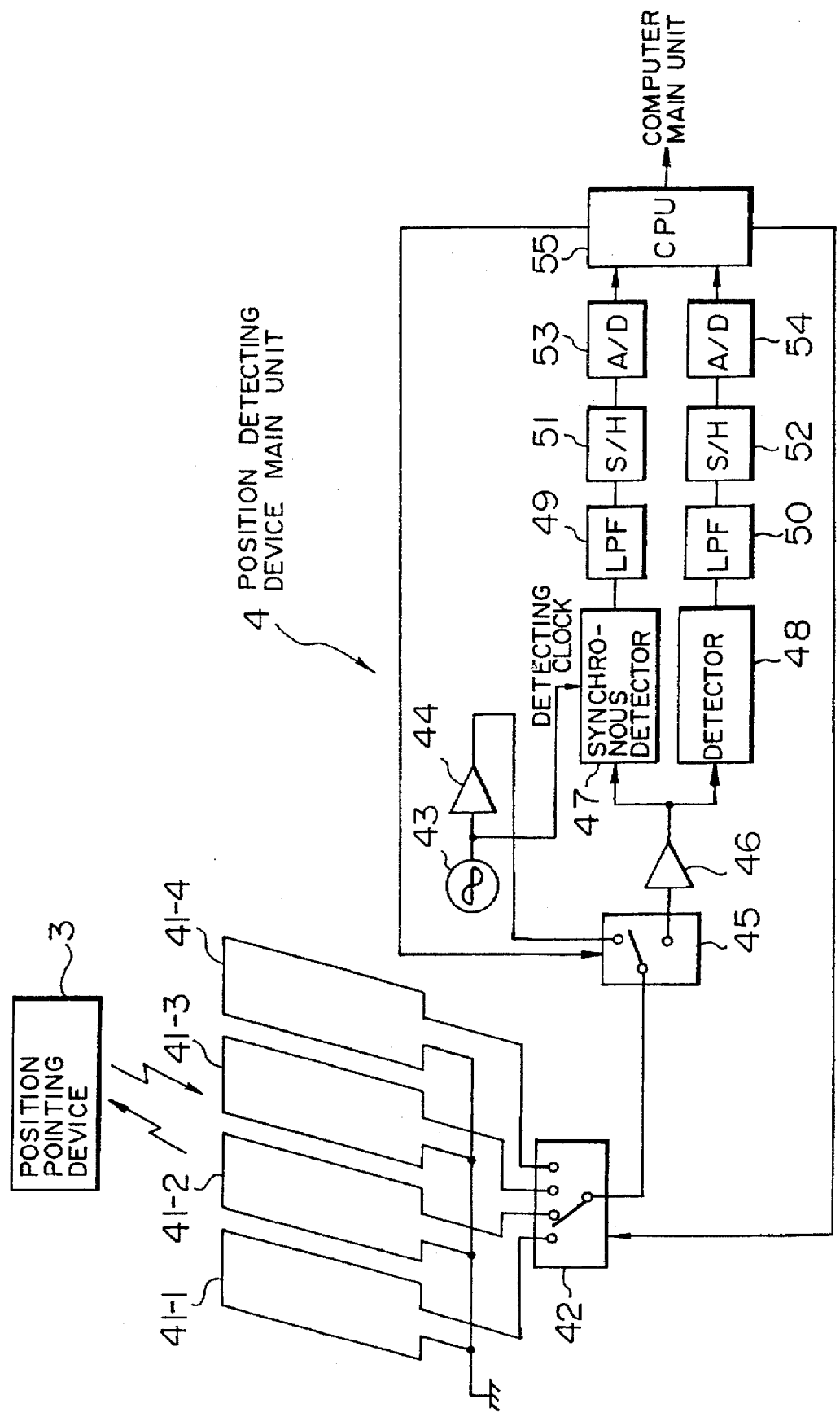
FIG. 6 is a configuration diagram of an embodiment of the position detecting device main unit.

FIG. 6 shows an embodiment of the position detecting device main unit 4. In the drawing, numerals 41-1, 41-2, 41-3, and 41-4 denote loop coils, numeral 42 a selecting circuit, numeral 43 an oscillator, numeral 44 a current driver, numeral 45 a transmit/receive switching circuit, numeral 46 a receiving amplifier, numeral 47 a synchronous detector, numeral 48 a detector, numerals 49 and 50 low-pass filters (LPFs), numerals 51 and 52 sample holding circuits (S/H), numerals 53 and 54 analog-to-digital (A/D) converting circuits, and numeral 55 a central processing unit (CPU).

The loop coils 41-1 through 41-4 are arranged nearly in parallel to each other in the position detecting direction, one end of each of them being connected to the selecting circuit 42, while the other end being grounded in common. The selecting circuit 42 selects one of the loop coils 41-1 through 41-4 in accordance with a selection signal received from the central processing unit 55 in a manner to be discussed later.

The oscillator 43 generates a sinusoidal AC signal having a frequency, which is almost equal to the resonance frequency of the resonance circuit 32 of the position pointing device 3 and sends it to the current driver 44 and the synchronous detector 47. The current driver 44 converts the AC signal to an electric current and sends it to the transmit/receive switching circuit 45. The transmit/receive switching circuit 45 connects a loop coil, which has been selected by the selecting circuit 42, to the current driver 44 and the receiving amplifier 46 alternately in a manner to be discussed later in accordance with a transmit/receive switching signal received from the central processing unit 55.

The receiving amplifier 46 amplifies the induced voltage, which is generated in the preselected loop coil and sent to the receiving amplifier 46 via the selecting circuit 42 and the transmit/receive switching circuit 45, and sends the amplified induced voltage to the synchronous detector 47 and the detector 48.

The synchronous detector 47 synchronously detects the induced voltage generated in the preselected loop coil, i.e., the received signal, with the AC signal received from the oscillator 43 used as the detection signal, and sends it to the low-pass filter 49. The detector 48 detects the induced voltage generated in the preselected loop coil, i.e., the received signal, and sends it to the low-pass filter 50.

The low-pass filters 49, 50 have a cut-off frequency, which is sufficiently lower than the resonance frequency of the resonance circuit 32, and they convert the output signals of the synchronous detector 47 and the detector 48 into DC signals and send them out to the A/D converting circuits 53, 54 via the sample holding circuits 51, 52. The A/D converting circuits 53, 54 respectively subject the outputs of the low-pass filters 49, 50 to the analog-to-digital conversion and send them out to the central processing unit 55.

The central processing unit 55 calculates the position of the resonance circuit 32 in accordance with the level distribution of the received signals, which were generated in the loop coils 41-1 through 41-4 during the coordinate detection period to be discussed later and which have been converted to digital values by the A/D converting circuit 54; it also detects a difference in phase from the AC signal received from the oscillator 43 in accordance with the level of the received signal, which was produced in the loop coil located most closely to the position of the resonance circuit 32 among the loop coils 41-1 through 41-4 at four respective timings at which electromagnetic waves are emitted for a certain duration at predetermined intervals after a timing at which the electromagnetic wave was generated for a predetermined period of time or longer and less than the longest period of time during the information identifying period to be discussed later. Based on the detected phase difference, the CPU 55 also detects the variation in the resonance frequency of the resonance circuit 32 caused by ON and OFF of the capacitors 33a and 33b, i.e., two bits of binary code out of eight bits of binary code expressing the operating information. Further, the CPU 55 detects a phase difference in accordance with the levels of the received signals, which were produced in the same loop coil as that mentioned above at four respective timings at which electromagnetic waves were emitted for a certain duration at predetermined intervals after a timing at which the electromagnetic wave was generated continuously for the longest period of time or longer during the information detection period and which have been converted to digital values through the A/D converting circuit 53. Based on the detected phase difference, the CPU 55 detects the variation in the resonance frequency of the resonance circuit 32 caused by ON and OFF of the capacitors 33a and 33b, i.e., two bits of binary code out of eight bits of binary code expressing the identifying information.

The position detecting device main unit 4 described above is designed for one-direction position detection; however, it is needless to say that a plurality of loop coils similar to the loop coils 41-1 through 41-4 may be arranged so that they cross orthogonally therewith, a selecting circuit similar to that described above provided, and other circuit selectively used so as to perform alternate position detection, thus detecting a pointed position in two orthogonal directions (x and y directions).

The operations of the position detecting device, which is constituted by the position pointing device 3 and the position detecting device main unit 4 described above, are roughly divided into those carried out during the coordinate detection period and those carried out during the information detection period, and these two types of operations are normally repeated alternately. Alternatively, however, the information detection period may be inserted only when necessary. Further, the information detection period is divided into two types; in one type of the information detection period, an electromagnetic wave is emitted continuously for a predetermined period of time or more but less than the longest period of time, while in the other type of information detection period, an electromagnetic wave is emitted for the longest period of time or more. These two types may repeated alternately or the latter type may be given once after the former type is given a few times.

During the coordinate detection period, the CPU 55 controls the transmit/receive switching circuit 45 so that the output of the selecting circuit 42 is connected to the current driver 44 and the receiving amplifier 46 alternately for a certain duration at predetermined intervals, and also controls the selecting circuit 42 so that the loop coil located most closely to the position pointing device 3 is selected among the loop coils 41-1 through 41-4 while the output of the selecting circuit 42 is being connected to the current driver 44, i.e., while the electromagnetic wave is being emitted, and the loop coils 41-1 through 41-4 are selected in sequence while the output of the selecting circuit 42 is being connected to the receiving amplifier 46, i.e., while the electromagnetic wave is being detected.

During the information detection period, the CPU 55 controls the transmit/receive switching circuit 45 so that the output of the selecting circuit 42 is connected continuously to the current driver 44 for not less than the predetermined period of time, and after that connected continuously to the receiving amplifier 46 for a period of time which is nearly the same as the predetermined period of time or continuously connected to the current driver 44 for the longest period of time or more, then connected continuously to the receiving amplifier 46 for almost the same period of time as the longest period of time, and then connected alternately to the current driver 44 and the receiving amplifier 46 for the certain duration at predetermined intervals. The CPU 55 also controls the selecting circuit 42 so that the loop coil located most closely to position pointing device 3 is selected among the loop coils 41-1 through 41-4 while the output of the selecting circuit 42 is being connected to the current driver 44, i.e., while the electromagnetic wave is being emitted and also while it is being connected to the receiving amplifier 46, i.e., while the electromagnetic wave is being detected.

The operation of the tablet during the coordinate detection period will be omitted because it is already disclosed in the previously mentioned Japanese Patent Laid-Open and others. In the position pointing device 3, the value of the counter 37c is unstable at the beginning; however, when the clocks issued from the comparator 35i in accordance with the electromagnetic wave, which is intermittently transmitted for a certain duration at predetermined intervals from the position detecting device main unit 4 for the purpose of coordinate detection, causes the count value on the counter 37c to reach a predetermined value (4 in this case), the D flip-flops 371, 372 are reset, the counter 37c also being reset by the output thereof. At this time, an output prohibiting signal is applied to the multiplexers 373, 374; therefore, the output is fixed (to "0" for example), thus fixing the status of the resonance circuit 32 also. Under this condition, the coordinate value of a position pointed by the position pointing device 3 is detected.

Then, when the electromagnetic wave is continuously emitted for not less than the predetermined period of time but less than the longest period of time from the position detecting device main unit 4 to detect information, the initiation timing signal issued from the comparator 35h resets the D flip-flop 372 and the reset of the counter 37c is released, causing the counter 37c to start counting the clocks received from the comparator 35i. The count value on the counter 37c is supplied to the multiplexers 373, 374 and the two bits of binary code selected thereby turn ON/OFF the switches 33c, 33d. Thus the resonance frequency of the resonance circuit 32 is changed to transmit the information to the position detecting device main unit 4. In this case, the output of the D flip-flop 371 remains "0"; therefore, the operating information, which is comprised of seven bits of pen pressure information, $P_0$ to $P_6$, supplied by the transducer 361 and one bit of side switch information SS, is transmitted. After that, when the counter 37c reaches a predetermined value ("4" in this case), the D flip-flops 371, 372 are reset and the counter 37c stops as described above.

Further, when the electromagnetic wave is emitted continuously from the position detecting device main unit 4 for the longest period of time for the purpose of information detection, the initiation timing signal issued from the comparator 35h sets the D flip-flop 372, the switching signal issued from the comparator 35g sets the D flip-flop 371, the reset of the counter 37c is released to cause the counter 37c to start counting the clocks received from the comparator 37i, and the output of the D flip-flop 371 becomes "1." The count value on the counter 37c is supplied to the multiplexers 373, 374 and the two bits of binary code selected thereby turn ON/OFF the switches 33c, 33d. Thus the resonance frequency of the resonance circuit 32 is changed to transmit the information to the position detecting device main unit 4. In this case, the output of the D flip-flop 371 is "1"; therefore, 8-bit identifying information, $I_0$ to $I_7$, supplied by the DIP switch 311 is transmitted. After that, when the counter 37c reaches a predetermined value ("4" in this case), the D flip-flops 371, 372 are reset and the counter 37c stops just as described above.

The position detecting device main unit 4 sends the operating information and the identifying information, together with the coordinate value of the pointed position, to the computer main unit 1. After that, the coordinate detection period comes again and the same coordinate detection and information detection as previously described are repeated.

Figure 7:
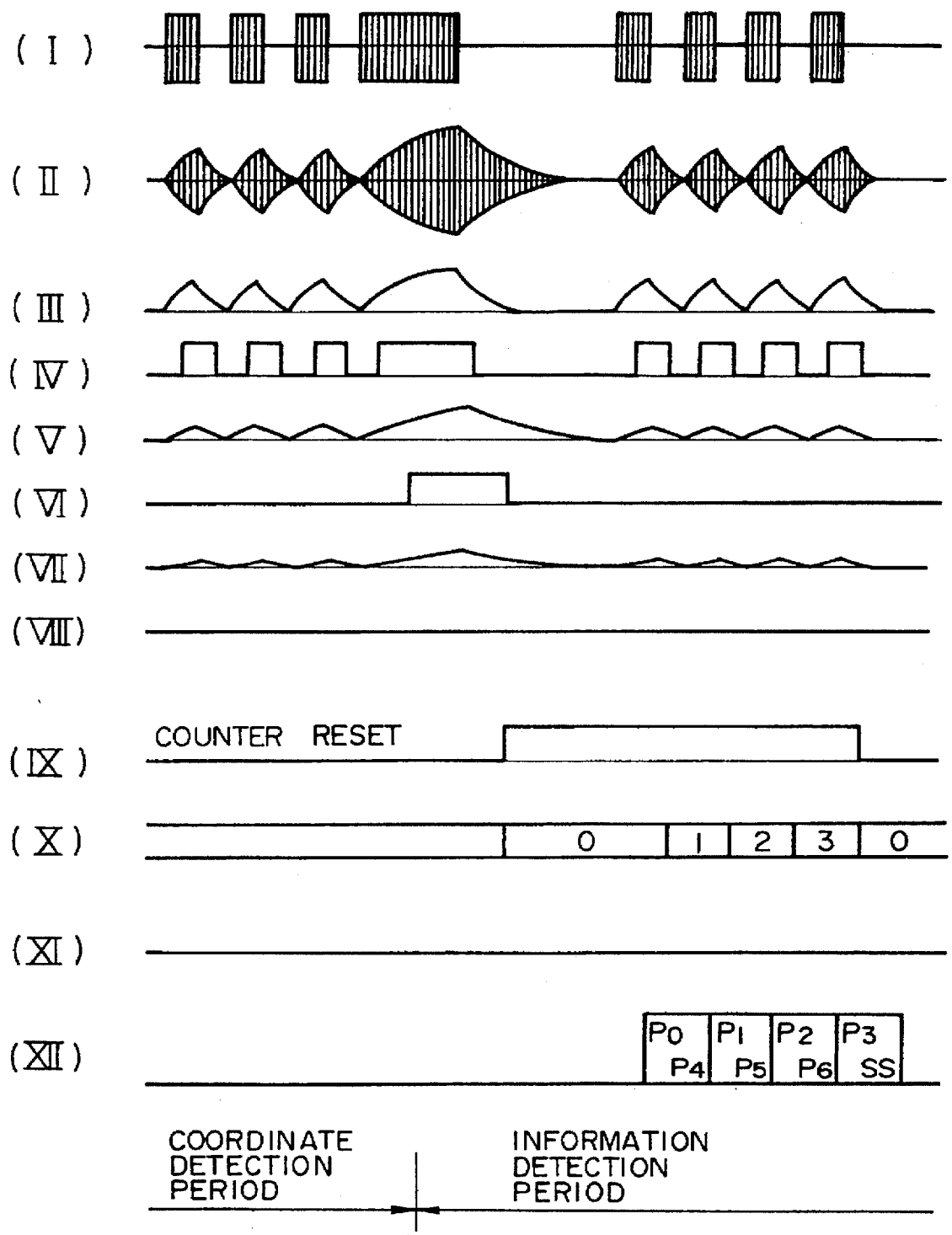
FIG. 7 is an operation waveform diagram of the position detecting device of FIG. 6.
Figure 8:
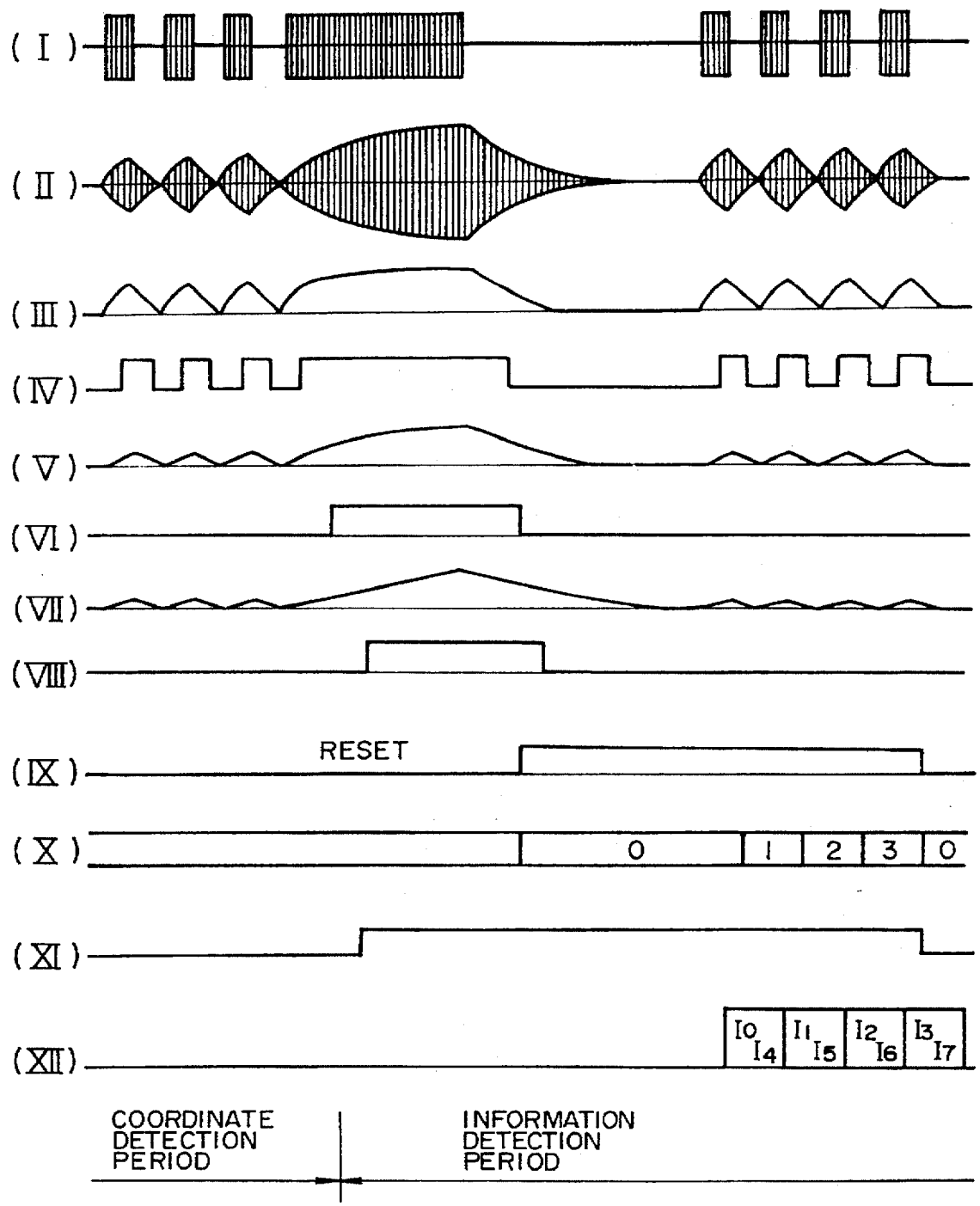
FIG. 8 is an operation waveform diagram of the position detecting device of FIG. 6.

FIGS. 7 and 8 show the examples of the operation waveforms involved in this embodiment. FIG. 7 is illustrative of the signal waveforms observed when the electromagnetic wave is continuously transmitted for not less than the predetermined period of time but less than the longest period of time, i.e., when the output of the D flip-flop 371 is "0" and the operating information comprised of the 7-bit pen pressure information supplied by the transducer 361 and the 1-bit side switch information are transmitted. FIG. 8 illustrates the signal waveforms observed when the electromagnetic wave is continuously transmitted for the longest period of time or more, i.e., when the output of the D flip-flop 371 is 1 and the 8-bit identifying information supplied by the DIP switch 311 is transferred.

Figure 9:
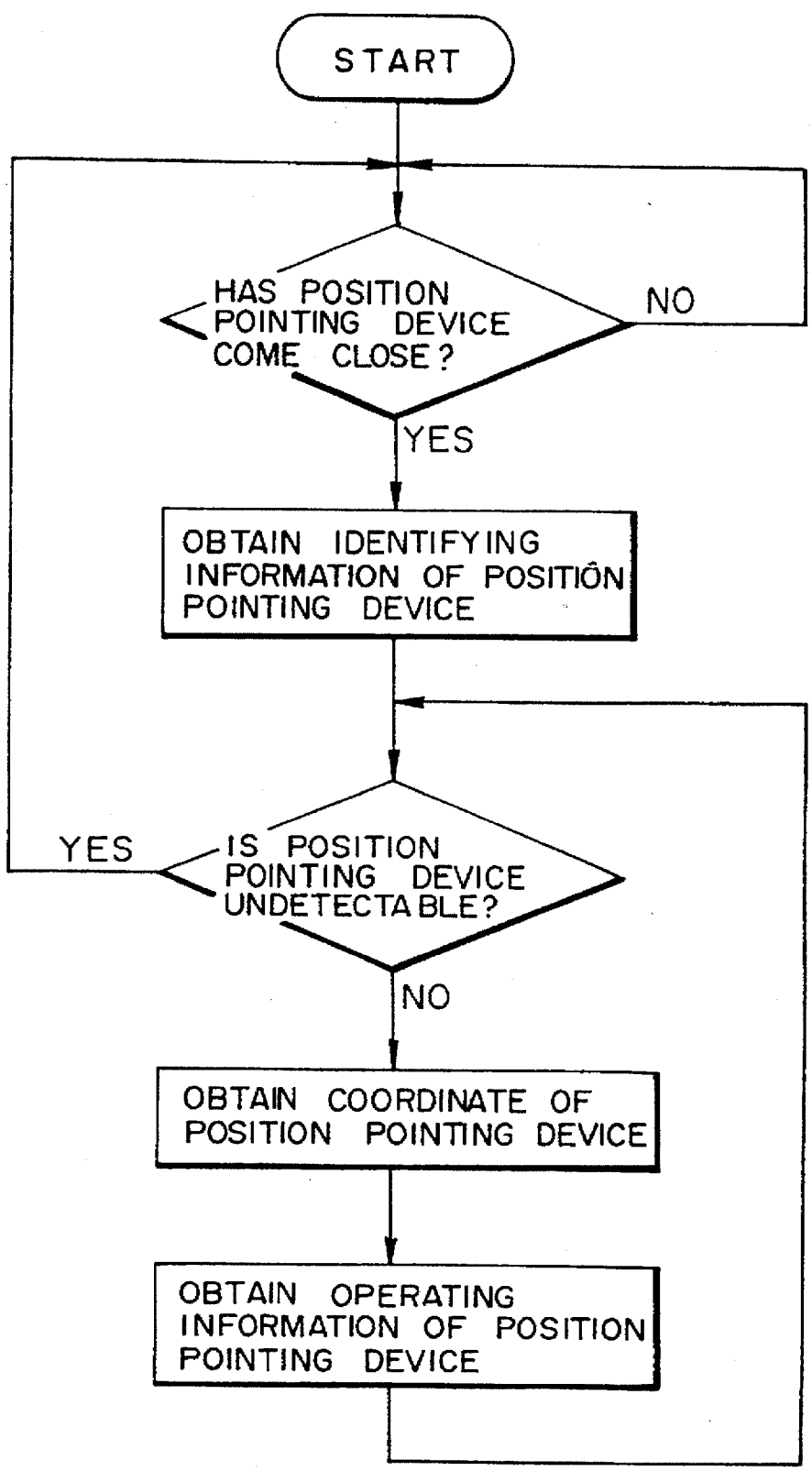
FIG. 9 is a schematic operation flowchart of the position detecting device main unit.

In the Figure, I denotes the signal transmitted from the position detecting device main unit 4, II the signal received by (induced voltage occurring in) the resonance circuit 32, III the output signal of the low-pass filter 35f, IV the output signal of the comparator 35i, V the output signal of the low-pass filter 35e, VI the output signal of the comparator 35h, VII the output signal of the low-pass filter 35d, VIII the output signal of the comparator 35g, IX the Q output of the D flip-flop 372, X the count value of the counter 37c, XI the Q output of the D flip-flop 371, and XII the signal received by the position detecting device main unit 4. FIG. 9 shows the schematic flow of the operations of the position detecting device main unit 4.

Figure 10:
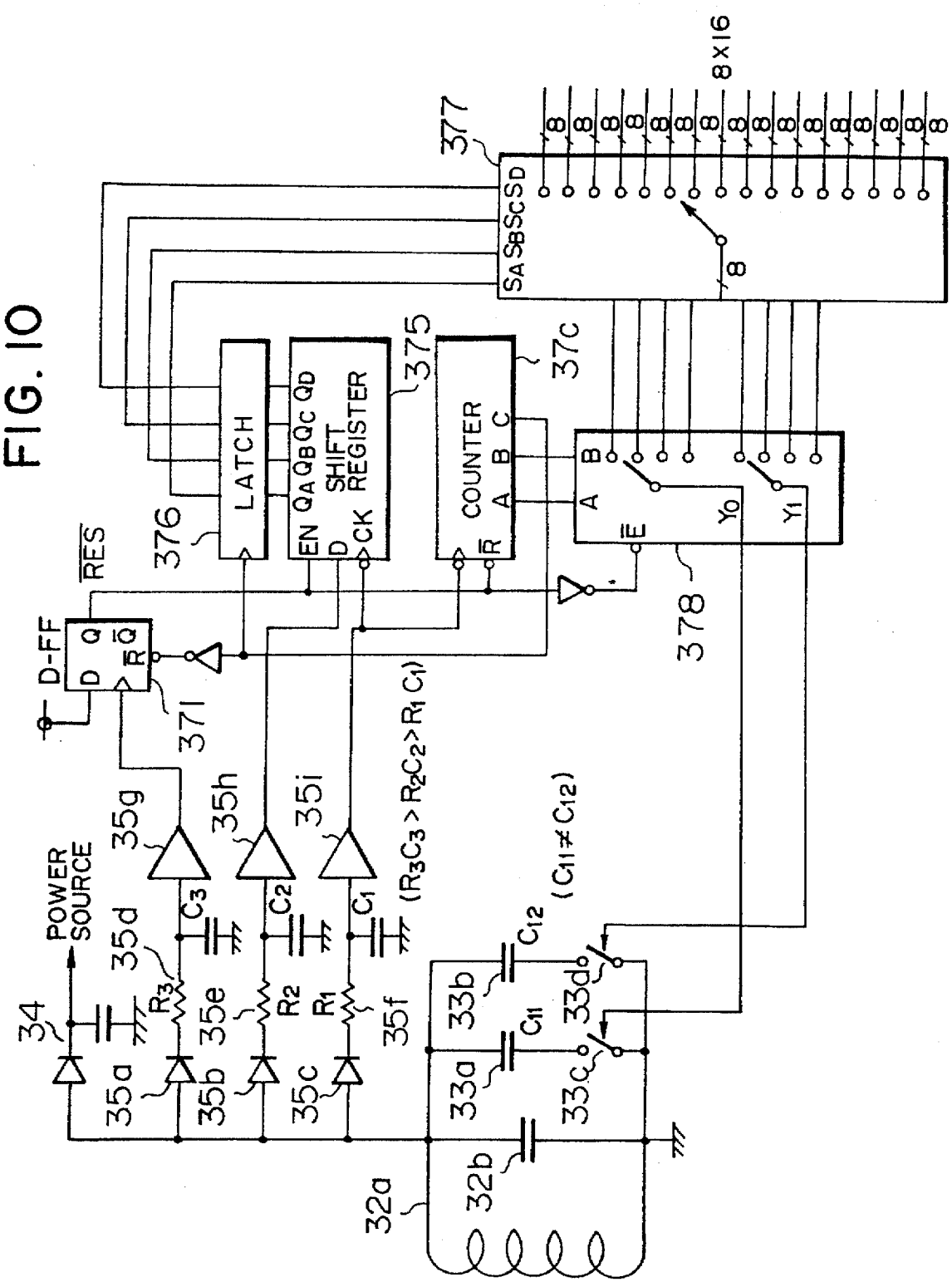
FIG. 10 is a configuration diagram of another embodiment of the position pointing device.

FIG. 10 is illustrative of another embodiment of the position pointing device 3. The embodiment is an example, wherein an instruction issued from the position detecting device main unit is received and information is transmitted to the position detecting device main unit at the same time. More specifically, a 4-bit instruction, which assigns code "1" to the electromagnetic wave lasting for not less than the predetermined period of time but less than the longest period of time and code "0" to the electromagnetic wave lasting for a certain duration, which is sufficiently shorter than the predetermined period of time, is transmitted from the position detecting device main unit to the position pointing device, the 4-bit instruction being preceded by the electromagnetic wave lasting for the longest period of time or more as the initiation bit. The information, which has been selected by the instruction in the preceding information detection period in synchronization with the timing of the 4-bit instruction, is transferred from the position pointing device to the position detecting device main unit by controlling the resonance frequency of the resonance circuit as previously described.

In the drawing, numeral 375 denotes a shift register. After the D flip-flop 371 is set by the output from the comparator 35g and actuated together with the counter 37c by the Q output thereof, the shift register 375 reads the output signal, i.e., the instruction, from the comparator 35h in accordance with the clocks received from the comparator 35i. Numeral 376 denotes a 4-bit latch, which latches the output of the shift register 375 when the counter 37c reaches a predetermined value (4 in this case). Numeral 377 indicates a selector, which selects a set of information out from sixteen sets of information including the identifying information (a total of 128 bits of information, 8 bits forming a piece of the information) in accordance with the 4-bit instruction held by the latch 376. Numeral 378 denotes a multiplexer which sends the information having 8 bits of binary code selected by the selector 377 to the switches 33c, 33d two bits at a time in synchronization with each bit of the instruction during the following information identifying period and transfers the information to the position detecting device main unit by changing the resonance frequency of the resonance circuit 32. The rest of the configuration is the same as that of the embodiment shown in FIGS. 4 and 5.

Figure 11:
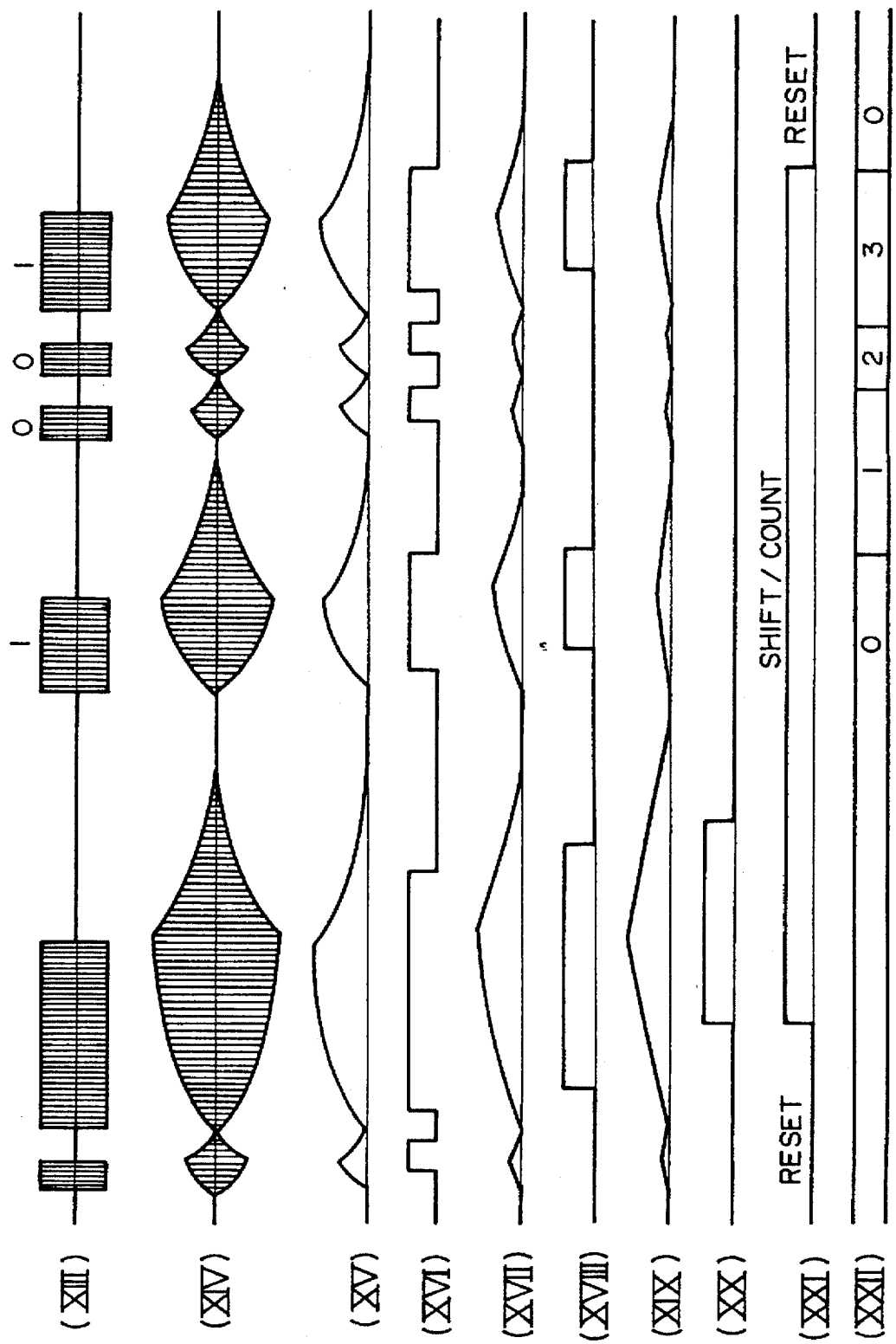
FIG. 11 is an operation waveform diagram corresponding to another embodiment of the position pointing device.

FIG. 11 shows the same signal waveforms as those of FIG. 8 (or FIG. 9), which are produced when the position pointing device of the present embodiment is employed. In the drawing, XIII shows the signal transmitted from the position detecting device main unit, XIV the signal received by (induced voltage in) the resonance circuit 32, XV the output signal of the low-pass filter 35f, XVI the output signal of the comparator 35i, XVII the output signal of the low-pass filter 35e, XVIII the output signal of the comparator 35h, XIX the output signal of the low-pass filter 35d, XX the output signal of the comparator 35g, XXI the Q output of the D flip-flop 371, and XXII the count value of the counter 37c.

In the description given above, the instructions are transferred in terms of the duration of the electromagnetic wave; however, they can be transferred also in terms of a pause, or furthermore, by adding various types of modulation to the electromagnetic wave.

The position detecting device explained above is designed to exchange electromagnetic waves alternately between the position pointing device and the position detecting device main unit; however, the present invention can be applied in the same manner to any other type of position detecting device. For instance, the present invention can be applied equally to a position detecting device which is designed to perform coordinate detection by continuously transmitting and receiving the electromagnetic wave.

Figure 12:
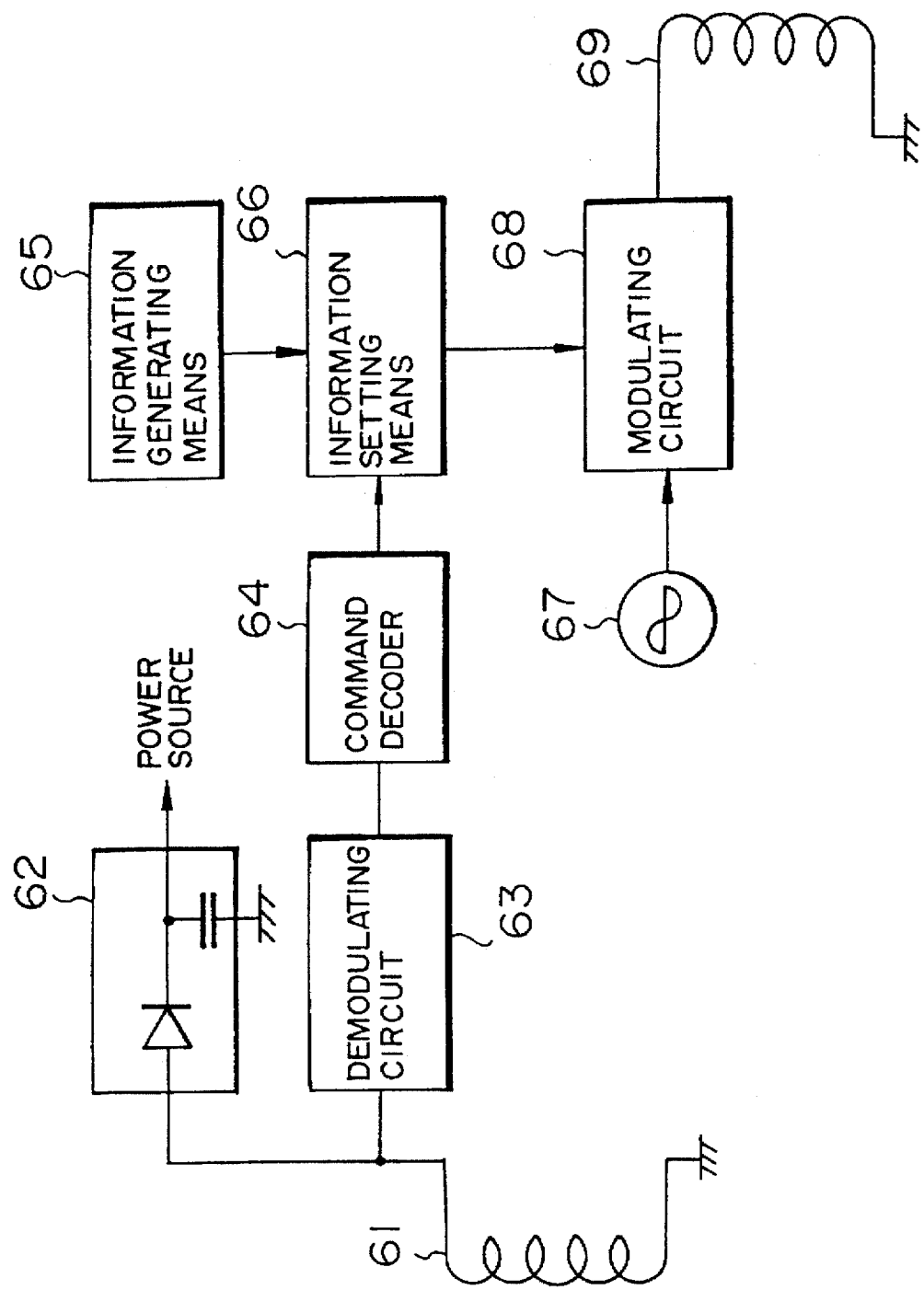
FIG. 12 is a configuration diagram of still another embodiment of the position pointing device.

FIG. 12 illustrates still another embodiment of the position pointing device 3; it shows an example of the position pointing device, which corresponds to the type of device designed to carry out the coordinate detection by continuously exchanging electromagnetic waves described above. More specifically, the device adds amplitude modulation, frequency modulation, frequency-shift modulation, phase-shift modulation, etc. to continuous electromagnetic waves to transfer instructions and information. The device shown in the drawing has a receiving coil 1, a rectifying circuit 62, a demodulating circuit 63, a command decoder 64, an information generating means 65, an information setting means 66, an oscillator 67, a modulating circuit 68, and a transmitting coil 69.

The electromagnetic wave transmitted from the position detecting device main unit which is not shown, that is, the electromagnetic wave which has been modulated in accordance with an instruction, is received by the receiving coil 61. At this time, the line voltage for driving the component units is taken out from the induced voltage, which has occurred, through the rectifying circuit 62 and it is demodulated through the demodulating circuit 63 and an instruction from the position detecting device main unit is extracted through the command decoder 64. The information setting means 66 sends out the identifying information, etc. received from the information generating means 65 to the modulating circuit 68 in accordance with the instruction, then the modulating circuit 68 modulates a carrier wave signal from the oscillator 67 in accordance with the identifying information, etc. it has received and supplies the modulated signal to the transmitting coil 69. As a result, the electromagnetic wave, which includes the identifying information, etc., is emitted from the transmitting coil 69 and the identifying information, etc. are transferred to the position detecting device main unit.

Figure 13:
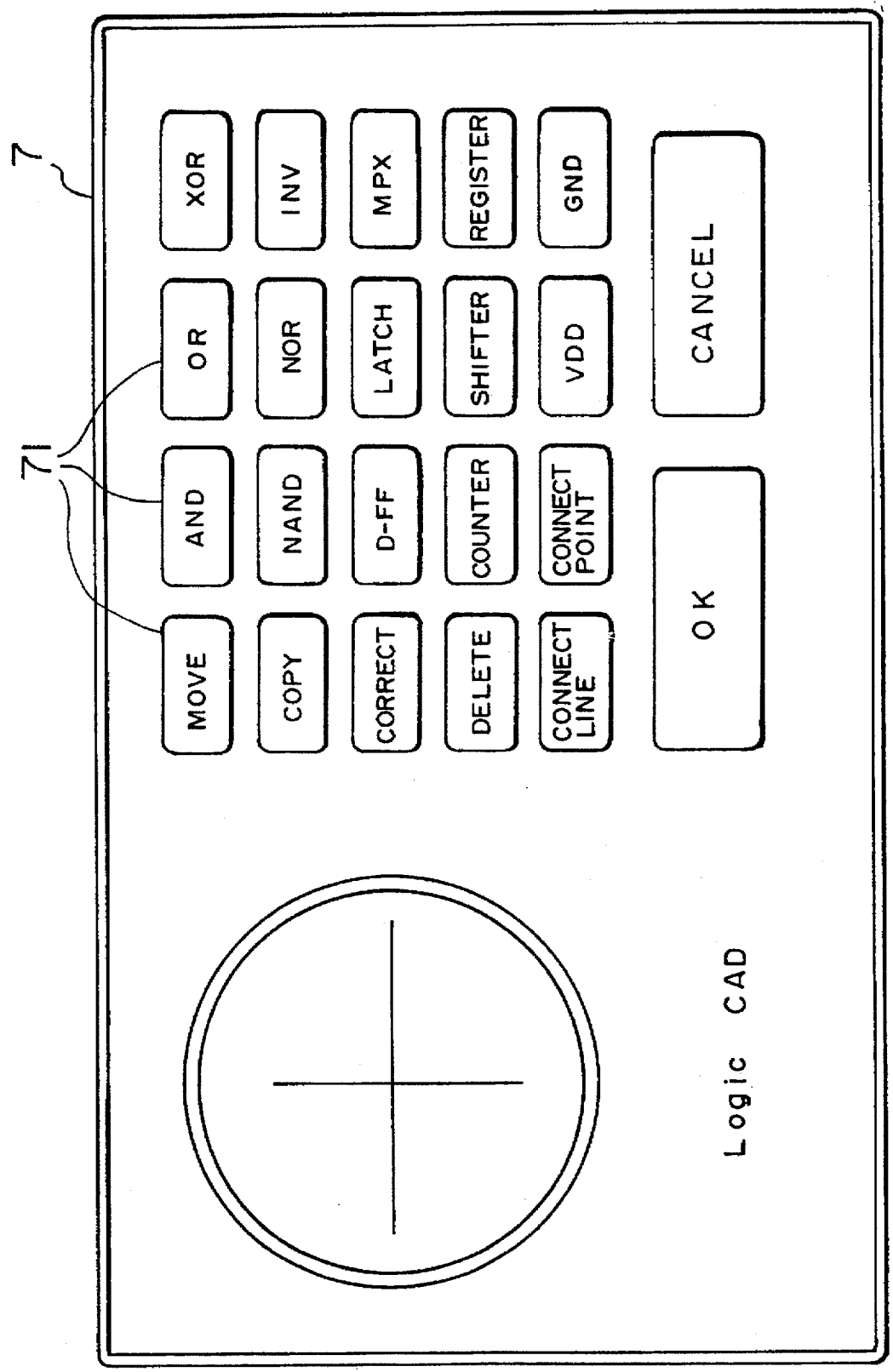
FIG. 13 is a configuration diagram of an example of the position pointing device equipped with an aspect suited for particular software.

FIG. 13 is a diagram of an example of the position pointing device provided with an aspect suited for a particular software program. More specifically, it is an example of the position pointing device suited for a software program used to design a logic circuit. In the drawing, numeral 7 denotes a position pointing device which looks like a typical cursor type one; it is equipped with many push buttons 71 for specifying a gate circuit and other circuits which are frequently used, allowing these circuits to be entered in a drawing without the need of opening a menu screen or the like. As the internal circuit configuration, the one of the position pointing device explained with reference to FIG. 10, for example, can be applied as it is. In such a case, the switch signals of the multiple push buttons 71 can be used as the input information for the selector 377.

Figure 14:
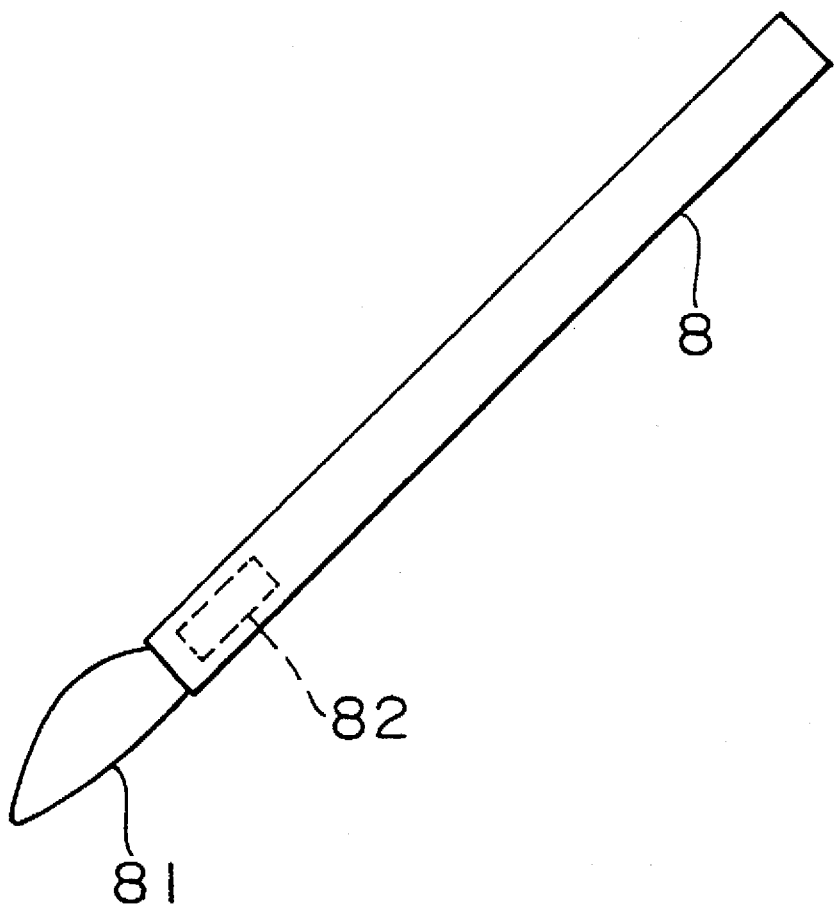
FIG. 14 is a configuration diagram of another example of the position pointing device equipped with an aspect suited for particular software.

FIG. 14 is an illustration of another example of the position pointing device equipped with an aspect suited for a particular software program. More specifically, it is an example of the position pointing device suited for the software program for practicing calligraphy. In the drawing, numeral 8 denotes a position pointing device which is equipped with bristles 81 just like a typical writing brush. The height of the position pointing device 8 is detected by the position detecting device main unit and the expansion of the graphic showing a pointed position is changed in accordance with the detected height, thus enabling an operator to operate the position pointing device as if he were manipulating a real writing brush. As an internal unit 82 for this position pointing device 8, the one of the position pointing device explained with reference to FIGS. 4 and 5, for example, can be applied as it is. In such a case, only identifying information is required as the information to be transmitted. The technology disclosed in Japanese Patent Application No. 63-326037 (Japanese Patent Laid-Open No. 2-171910) by the applicant of the present invention can be employed to detect the height of the position pointing device.

FIG. 15 is a diagram of still another example of the position pointing device equipped with an aspect suited for a particular software program. More specifically, it is an example of the position pointing device suited for a clerical processing software program. In the drawing, numeral 9 denotes a position pointing device which has a seal 91 at the distal end thereof. By placing document A to be processed on the position detecting device main unit and putting the seal to it, the completion of processing can be reported to the computer main unit or other host computer or the like connected thereto. The use of the position detecting device main unit combined with a display unit to display a document on the display screen thereof eliminates the need of specifying the document. As an internal unit 92 for this position pointing device 9, the one of the position pointing device explained with reference to FIGS. 4 and 5, for example, can be applied as it is. In such a case, only identifying information is required as the information to be transmitted.

A plurality of position pointing devices equipped with, for example, different functions, can be used as the particular position pointing devices for a single particular software program. Further, it is needless to say that, even when a position detecting device, which permits the use of a plurality of position pointing devices at the same time, is employed, an operation on only a particular software program can be implemented through a particular position pointing device as described previously. Furthermore, a general-purpose position pointing device may be prepared in addition to the particular position pointing device for a particular software program, and by providing only an operator, who is familiar with the whole system, with the general-purpose position pointing device, the similar operability as that described above can be maintained.

Thus, according to one aspect of the present invention, there is provided a computer system equipped with a position detecting device capable of transmitting other information in addition to positional information to a position detecting device main unit from a position pointing device, and software using the position detecting device as the major input device, the computer system further including an identifying information generating means which generates identifying information for telling a particular position pointing device that it is a position pointing device matched to a particular software program, a software recognizing means for recognizing a particular software program from the identifying information which is generated from the aforesaid particular position pointing device and entered through the position detecting device main unit, and a software selecting means for selectively supplying various types of information, which is issued from the position detecting device main unit when the aforesaid particular position pointing device is operated, only to a particular software program. Hence, even when a plurality of software programs are running at the same time, an operation can be implemented only on the particular software program by selecting and operating the particular position pointing device matched to the required particular software program. Therefore, by providing an operator, who is, for example familiar only with a particular software program, with only a particular position pointing device which is matched to the particular software program, the danger of the operator erroneously operating other software can be eliminated.

Further, according to another aspect of the present invention, there is provided a computer system equipped with equipped with a position detecting device capable of transmitting other information in addition to positional information to a position detecting device main unit from a position pointing device, and software which uses the position detecting device as the major input device, the computer system further including an identifying information generating means which generates identifying information for telling a particular position pointing device that it is a position pointing device matched to a particular software program, a software recognizing means for recognizing a particular software program from the identifying information which is generated from the aforesaid particular position pointing device and entered through the position detecting device main unit, an initiation determining means for determining whether the particular software program has already been initiated, and a software initiating means which initiates the particular software program if the determination result indicates that the particular software program has not been initiated yet. Hence, even if an operator does not know how to initiate software, the operator can initiate and operate a required particular software.

According to a further aspect of the present invention, there is provided a computer system equipped with a position detecting device capable of transmitting other information in addition to positional information to a position detecting device main unit from a position pointing device, and software which employs the position detecting device as the major input device, the computer system further including an identifying information generating means which generates identifying information for telling a particular position pointing device that it is a position pointing device matched to a particular software program, a software recognizing means for recognizing a particular software program from the identifying information which is generated from the aforesaid particular position pointing device and entered through the position detecting device main unit, an initiation determining means for determining whether the particular software program has already been initiated, a software initiating means which initiates the particular software program if the determination result indicates that the particular software program has not been initiated yet, and a software selecting means for supplying various types of information, which is issued from the position detecting device main unit when the aforesaid particular position pointing device is operated, only to a particular software program. Hence, even when a plurality of software programs are running at the same time, an operation can be implemented only on the particular software program by selecting and operating the particular position pointing device matched to the required particular software program. Moreover, if the aforesaid particular software program has not been initiated, then it can be automatically initiated, and after that, the operation only on the particular software program can be implemented. Therefore, by providing an operator, who is, for example familiar only with a particular software program, with only a particular position pointing device which is matched to the particular software program, the danger of the operator erroneously operating other software can be eliminated. Further, even if the operator does not know how to initiate the software, the operator can operate it.

According to still an additional aspect of the present invention, a particular position pointing device has an aspect optimized for a particular software program; therefore, the operability based on the characteristics of the particular software program can be achieved, enabling the best possible use of the characteristics of the particular software.

What is claimed is:

1. A computer system comprising a position detecting device which is capable of transmitting other information in addition to positional information to a position detecting device main unit from a position pointing device, and software which said position detecting device as a major input device, said computer system further comprising:

an identifying information generating means which generate identifying information for telling said position pointing device that it is position pointing device matched to a particular software program;

a software recognizing means for recognizing a particular software program from the identifying information which is generated by said position pointing device and entered through the position detecting device main unit; and a software selecting means for selectively supplying various types of information, which is issued from the position detecting device main unit when said position pointing device is operated, only to a particular software program.

2. A computer system equipped with a position detecting device which is capable of transmitting other information in addition to positional information to a position detecting device main unit from a position pointing device, and software which employs said position detecting device as a major input device, said computer system further comprising:

an identifying information generating means which generates identifying information for telling said position pointing device that it is a position pointing device matched to a particular software program;

a software recognizing means for recognizing a particular software program from the identifying information which is generated by said position pointing device and entered through the position detecting device main unit;

an initiation determining means for determining whether said particular software program has already been initiated; and a software initiating means which initiates said particular software program if a result of said determination indicates that it has not been initiated yet.

3. A computer system equipped with a position detecting device which is capable of transmitting other information in addition to positional information to a position detecting device main unit from a position pointing device, and software which employs said position detecting device as a major input device, said computer system further comprising:

an identifying information generating means which generates identifying information for telling said position pointing device that it is a position pointing device matched to a particular software program;

a software recognizing means for recognizing a particular software program from the identifying information which is generated by said position pointing device and entered through the position detecting device main unit;

an initiation determining means for determining whether said particular software program has already been initiated;

a software initiating means which initiates said particular software program if a result of said determination indicates that it has not been initiated yet; and a software selecting means for selectively supplying various types of information, which is issued from the position detecting device main unit whether said particular position pointing device is operated, only to a particular software program.

4. A computer system according to claim 1, wherein said position pointing device has an aspect optimized for a particular software program.

5. A computer system according to claim 1, wherein said position detecting device includes cordless position pointing device which uses a battery as a power source thereof.

6. A computer system according to claim 1, wherein said position detecting device includes a cordless position pointing device having a resonance circuit.

7. A computer system according to claim 1, wherein said position detecting device includes a cordless position pointing device which has a resonance circuit and which uses energy generated in said resonance circuit as a power source thereof.

8. A computer system comprising a position detector main unit, an implement having a position to be detected by the position detector main unit, the position detector main unit and the implement being adapted to exchange energy, a computer including a software program associated with the implement, the computer being responsive to signals from the position detector main unit, a signal source for causing the position detector main unit to supply first and second signals to the computer respectively indicative of the position of the implement relative to the position detector main unit and of the identity of the implement while the implement and the position detector main unit exchange energy, the computer responding to the signals to derive an indication of the implement position and selecting the software program associated with the implement.

9. The computer system of claim 8 wherein a plurality of implements are included and said computer includes a plurality of software programs, different ones of said software programs being associated with different ones of said implements, the identity of each of said implements being indicated by a different second signal, the computer responding to the second signal to select a particular software program associated with a particular one of the different implements.

10. The computer system of claim 9 wherein the different ones of said implements have different characteristics and different ones of said programs have different characteristics corresponding with the characteristics of the particular implement associated with the particular program.

11. The computer system of claim 8 wherein the signal source is included on the implement.

12. The computer system of claim 8 wherein the computer is arranged to determine whether said program has been initiated, the computer initiating said program in response to receipt of the second signal while the determination indicates the program has not been initiated.

* * * * *